INVENTOR.
Burton W. Ahlson
BY
Murray G. Gleeson
ATTORNEY

March 4, 1958 B. W. AHLSON 2,825,544
MECHANICAL MINER HAVING BORING ARMS WHICH
FORM A RECTANGULAR SHAPED BORE
Filed Nov. 16, 1954 4 Sheets-Sheet 4

INVENTOR.
Burton W. Ahlson
BY
Murray G. Gleeson
ATTORNEY

United States Patent Office 2,825,544
Patented Mar. 4, 1958

2,825,544

MECHANICAL MINER HAVING BORING ARMS WHICH FORM A RECTANGULAR SHAPED BORE

Burton W. Ahlson, Flossmoor, Ill., assignor to Goodman Manufacturing Company, Chicago, Ill., a corporation of Illinois Application November 16, 1954, Serial No. 469,237

4 Claims. (Cl. 262—7)

This invention relates particularly to mining machines of the type having a pair of rotating boring arms for cutting coal or other mineral from the solid seam thereof, and relates to improvements in such machines whereby the arms can cut a bore of substantially parallelogram shaped cross-section in a seam of material.

In the machines of the prior art employing a pair of boring arms which cut overlapping contiguous bores there have been provided upper and lower cutter chains and their guides have been provided with sprockets movable into position whereby the action of the cutter chains trained about such sprockets and their guides is such that a substantially rectangular shaped bore may be cut in the seam.

According to the present invention it is not necessary to employ such upper and lower guided chains and movable sprockets therefor since the action of the boring arms in the machine embodying the improvements herein is such that a rectangular shaped bore is made in the seam by means of the boring arms alone. In forming the bore, the boring arms move rotatably in a path such that the projection of each of the boring arms on a plane normal to its turning center is substantially in the form of a square. The boring arms are arranged to pivot with respect to the longitudinal axis of a boring shaft upon which the boring arm is mounted, and as the boring arm rotates with the shaft the end of the boring arm remote from the boring shaft follows a path of such a configuration that its projection on the aforesaid plane is substantially in the form of a square.

The aforesaid movement to the boring arm is achieved by a three dimensional cam, generally in the form of a crown having a contour such that when the boring arm follows the cam the arm will move in the fashion previously described.

With the foregoing considerations in mind it is a principal object of the invention to provide an improved type of miner of the multi-bore type, characterized by the absence of any formation of upper and lower cusps and characterized in its construction by boring arms each of which cuts a square shaped bore contiguous to a similar bore.

Another object of the invention is to provide a cam having three dimensions such that a rotating boring arm may follow the cam whereby the periphery described by the rotating boring arm has a projection on a plane normal to the center of rotation of the boring arm in the form of a square.

Other objects and important features of the invention will be apparent from a study of the specification following taken with the drawings, which together show a preferred embodiment of the invention and what is now considered to be the best mode of practicing the principles thereof. Other embodiments of the invention may be suggested to those having the benefit of the teachings herein, and it is therefore intended that the scope of the invention not be limited by the precise embodiment herein shown, such other embodiments being intended to be reserved especially as they fall within the scope and purview of the claims subjoined.

In the drawings which illustrate a preferred embodiment of the invention:

Figure 1:
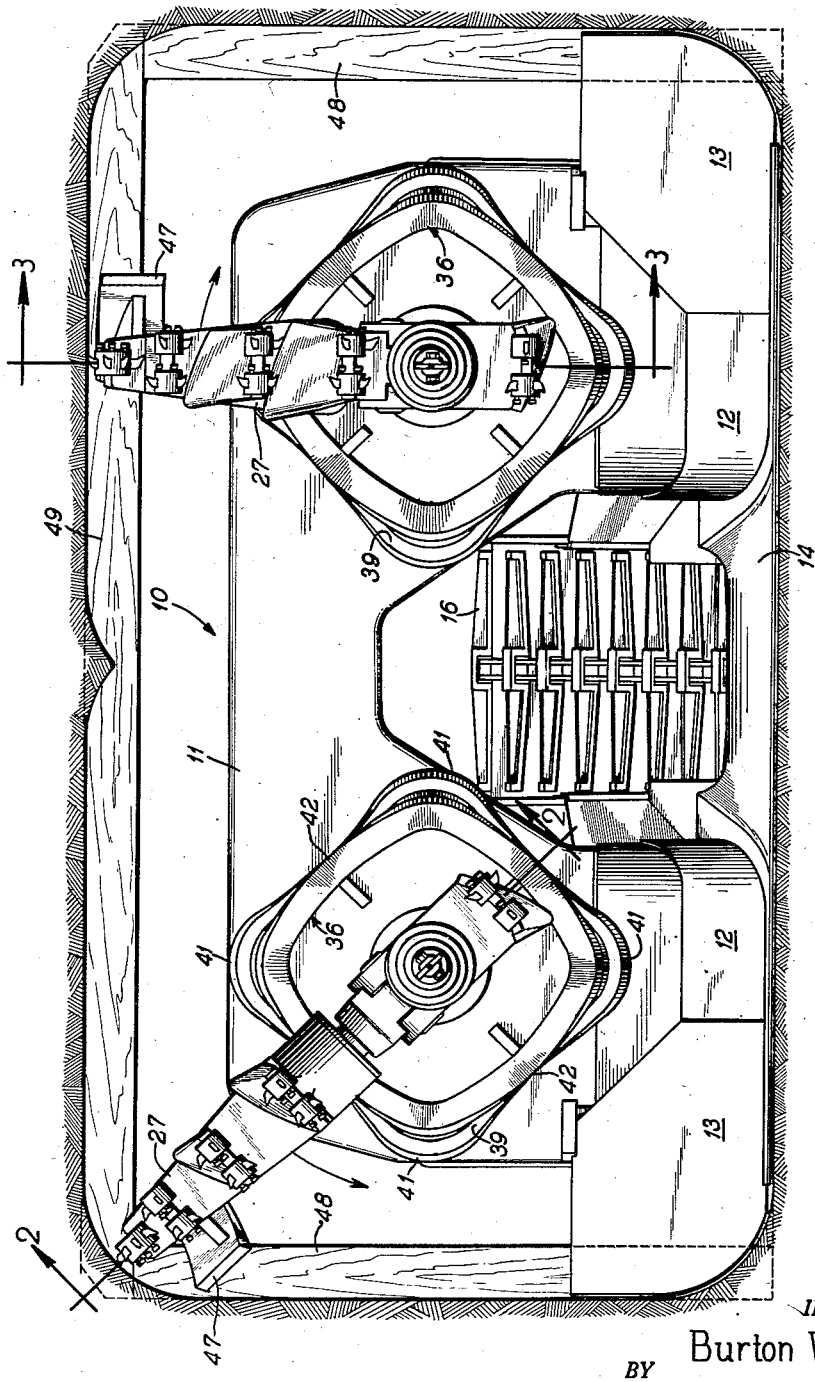
Fig. 1 is an elevation view of the boring head of a continuous miner having the improvements according to the present invention embodied therein.

Referring now to Fig. 1 of the drawings, there is shown a mining machine indicated generally by the reference numeral 10, and having the improvements according to the present invention embodied therein. The general construction of such a machine may be that shown in an application of Frank Cartlidge, Ser. No. 398,958, filed December 18, 1953, now Patent No. 2,757,917, for Improvements in Mining Machines. Machines of the general type referred to in the aforesaid Cartlidge application are provided with a drive housing 11 having extending therefrom a main pusher plate 12 and an auxiliary pusher plate 13 movable with respect to the main pusher plate in a horizontal direction. Means for moving the auxiliary pusher plate may be that as more specifically shown in an application of Ralph Risse, Ser. No. 456,953, filed September 20, 1954, now Patent No. 2,801,836, for Improvements in Mechanical Miner.

The machine 10 has a throat 14 for the transfer of dislodged material on to an endless conveyor 16 extending longitudinally thereof.

Figure 2:
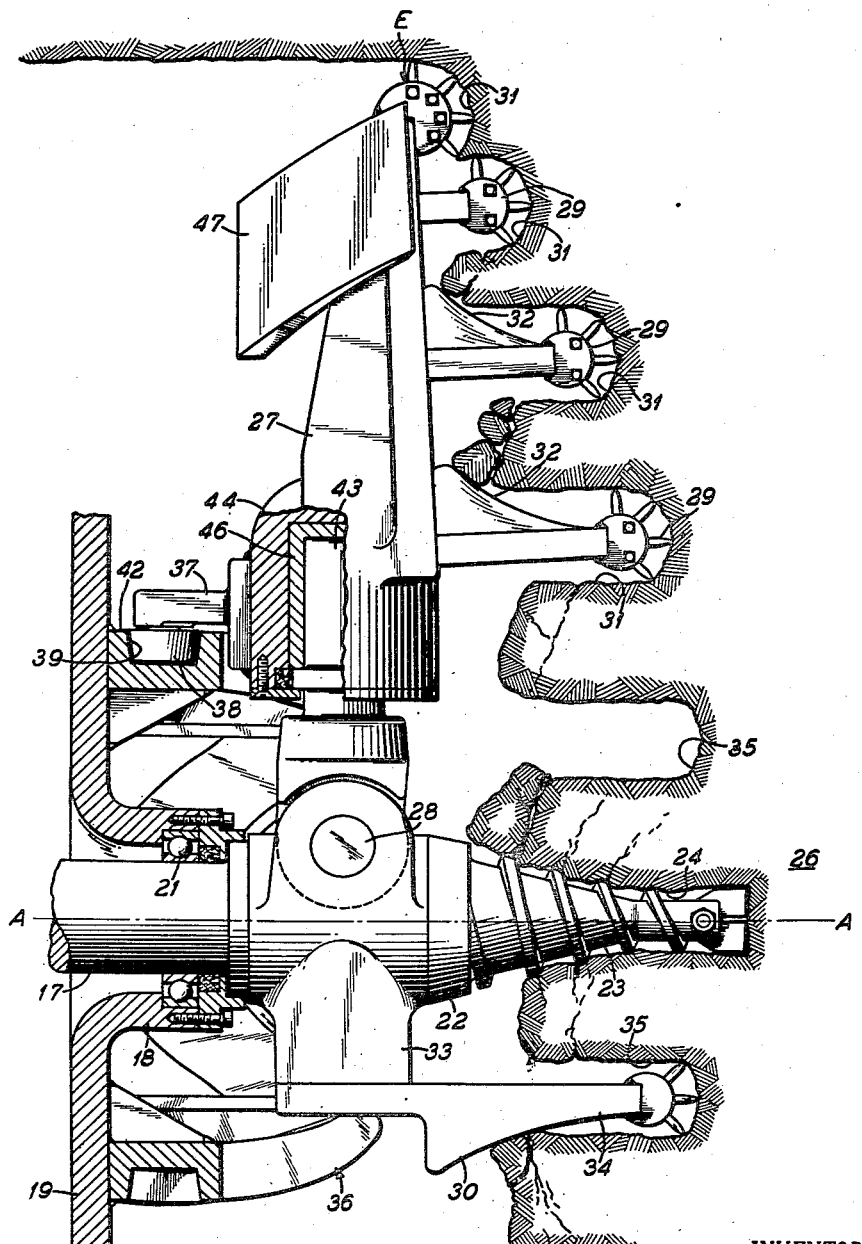
Fig. 2 is a section taken along the line 2—2 of Fig. 1, looking in the direction of the arrows certain parts being shown in side elevation illustrating one of the boring arms in its rotation on its boring shaft, and showing a cam mechanism whereby the periphery of the boring arm is caused to describe a square on a projection plane normal to the axis of the boring shaft.
Figure 3:
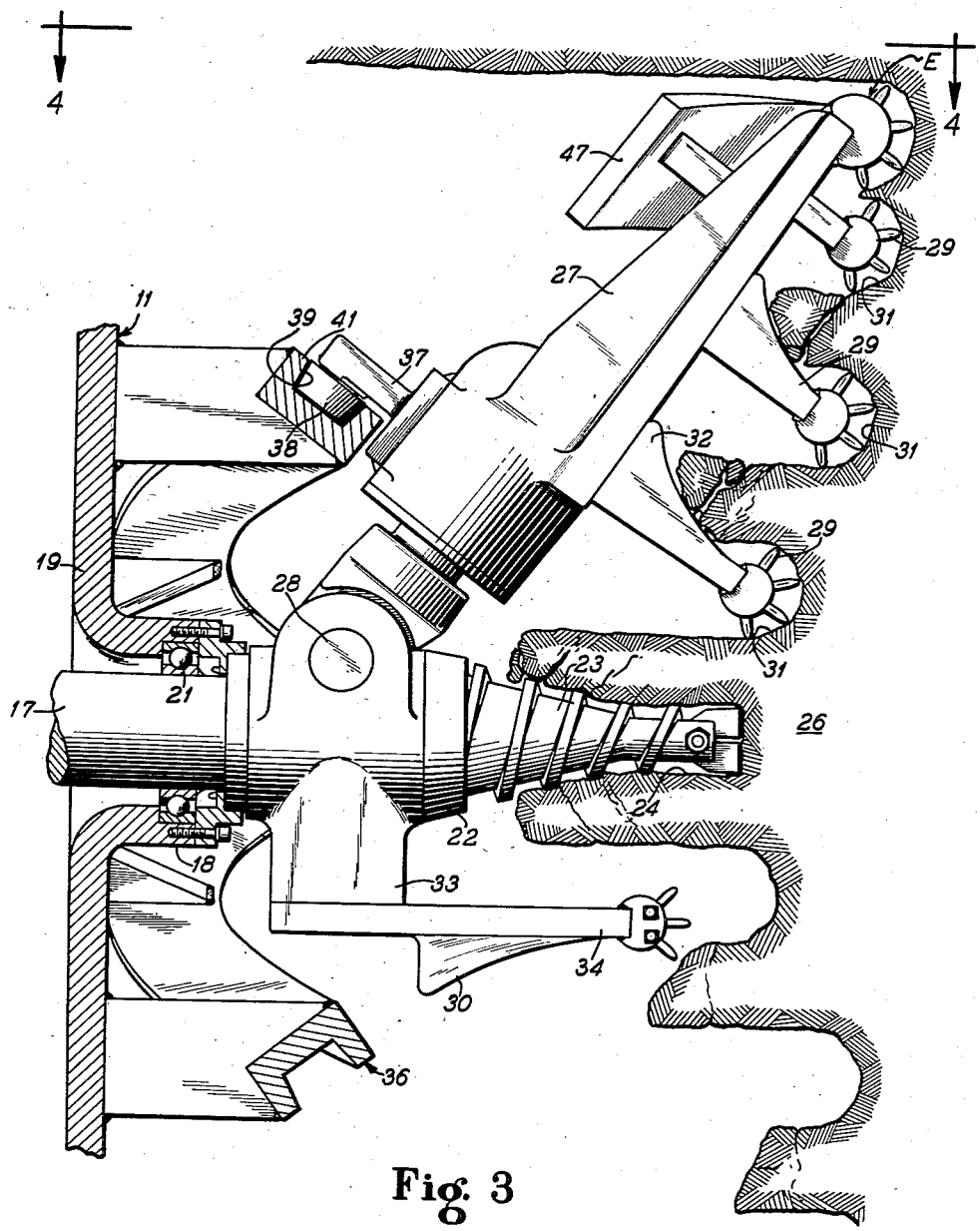
Fig. 3 is a view taken along the line 3—3 of Fig. 1 certain parts being shown in side elevation, and illustrating the position of the other of the boring arms shown in Fig. 1 with reference to the cam mechanism for causing the boring arm to have a peripheral path describing a square on a projection plane thereof normal to the boring shaft axis.

The machine 10 includes a pair of spaced boring shafts 17 as seen more particularly in Figs. 2 and 3. Each of the boring shafts 17 extend through an annular boss 18 formed in a forward wall 19 of the drive housing 11, the boring shafts 17 each being supported in a bearing 21 held in the annular boss 18.

The end of the shafts 17 protruding beyond the boss 18 is provided with a support hub 22 which is fast to shaft 17, the support hub 22 being formed integrally with a spiral bit 23 for cutting a pilot bore 24 in a seam of coal 26 or the like.

The hub 22 has extending therefrom a boring arm indicated generally by the reference numeral 27. Said boring arm is arranged to move pivotally with respect to the hub 22 upon a pin 28, and is arranged to follow a path as will be described whilst rotating with the boring shaft 17.

As seen in Figs. 2 and 3 the boring arm 27 is provided with a plurality of cutting elements 29 thereon so arranged as to cut a plurality of kerfs 31 or the like in the seam of coal 26, the cutter elements being provided with suitable surfaces 32 for wedging off the cores formed between the kerfs 31. The support hub 22 also has a radial extension 33 and an arm and cutter element 34 extending from the extension 33 to cut a circular kerf 35 in the seam 26, the arm 34 having a member 30 for wedging off the core formed.

Figure 4:
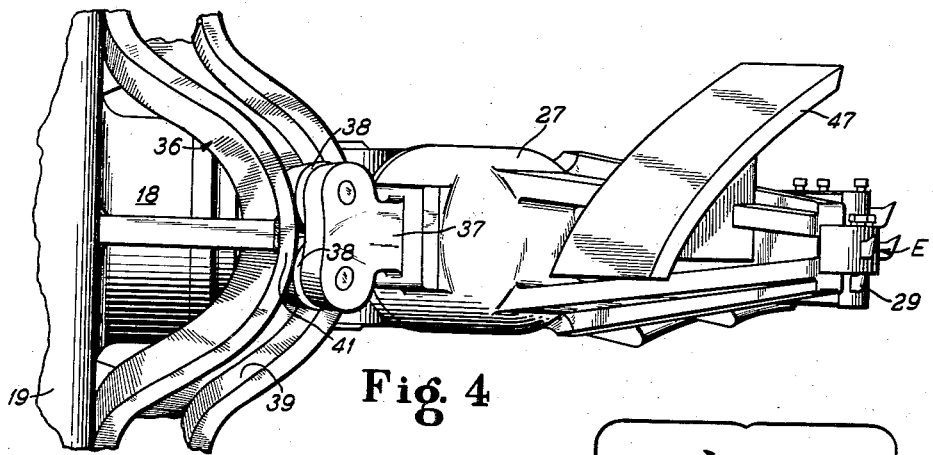
Fig. 4 is a plan view of one of the boring arms taken along the line 4—4 of Fig. 3 and looking in the direction of the arrows.
Figure 5:
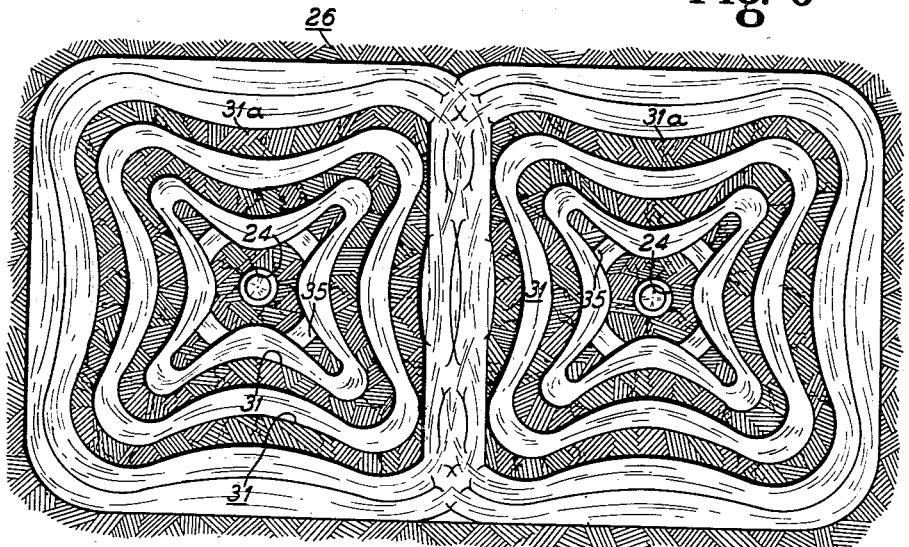
Fig. 5 is a view looking in the direction of a seam in which the mining machine according to the present invention has operated, illustrating the action of the cutting elements mounted upon the boring arms shown in Figs. 1 to 4 inclusive.

The boring arm 27 which is pivotally mounted upon the pin 28 to the hub 32 is forced against a three dimensional cam referred to generally by the reference numeral 36. As seen in Figs. 2, 3 and 4, the cam 36 is generally of a crown configuration. The locus of all points upon the cam 36 is such that the projection of all the points E upon the boring arm 27 on a plane normal to an axis A—A of the boring shaft 17 is in the form substantially of a square as seen in Fig. 5.

As seen in Figs. 2, 3 and 4 the boring arm 27 has a cam follower or extension 37 therefrom supporting a pair of free turning rollers 38 which follow a guideway 39 formed in the cam 36. As seen in Fig. 4, the extension 37 is at a lobe 41 of the cam 36, a point where the point E of the boring arm 27 is describing its shortest travel peripherally in its rotation. As seen in Fig. 2, the cam follower 37 and the rollers 38 of the boring arm 27 are at a low point 42 upon the cam 36, at which point the point E of the boring arm 27 is describing its longest dimension of travel, the projection of the point E upon the plane normal to the axis A—A at all times describing locus of points on the boundaries of a square.

In order that the boring arm 27 may swivel with respect to the hub 22 in following the undulations of the cam 36, the support hub 22 has a stub extension 43. The boring arm 27 has a hub 44 lined with a bushing 46 surrounding the stub shaft extension 43. By such a construction the boring arm 27 may swivel about the stub shaft 43 in following the contours of the three dimensional cam 36.

The boring arm 27 is provided with a plow plate 47 mounted near the end thereof, the action of the plow plate 47 being such as to sweep the cuttings at the bottom of rotation of each arm 27 in a direction towards the throat 14, as seen in Fig. 1.

The arms 27 have certain amount of overlap so as to describe substantially a rectangular shaped bore within the seam 26. The face of the seam appears as seen in Fig. 5 after the operation of the two boring arms, the boring arms leaving the traces shown, with the ribs 31 between each of the kerfs 29.

Figure 6:
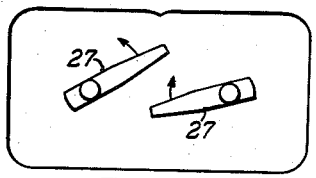
Fig. 6 is a view illustrating how the boring arms may be moved to a position whereby the machine may be retracted from the seam in which it operates.

Referring again to Fig. 1 of the drawings, the lateral dimensions of the machine are such that the room in which the machine 10 operates can be timbered in accordance with the width of the machine and roof props 48 may be disposed in position on each side of the machine to support roof beams 49. If it is desired to retract the machine from the room which has been cut by the operation of the machine 10 the side pusher plates 13 can be retracted as disclosed in the aforesaid Risse application and the two boring arms 27 moved to the position seen in Fig. 6 clearing the roof beam 49.

It is thus believed evident that the machine according to the present invention is capable of cutting a substantially rectangular shaped bore within a seam of coal or the like without the need of cutter chains following the advance of the boring arms, which cutter chains have been previously necessary in order to remove the upper and lower cusps remaining from the action of the boring arms.

While the invention has been described in terms of a preferred embodiment its scope is intended to be limited only by the terms of the claims here appended.

I claim as my invention:

1. In a boring type miner, a boring head having a plurality of boring shafts extending therefrom, a boring arm extending from each of said boring shafts, pivot means pivotally connecting each of said boring arms to the respective boring shafts for swiveling movement of said boring arms in a plane passing through the longitudinal axis of the respective boring shaft, said boring shafts and their associated boring arms rotating in timed relationship, each of said boring arms having cutter bit supports spaced along the length thereof and extending therefrom, cutter bits mounted on said supports, means for causing the end of each of said boring arms to describe in its rotation a substantially rectangular shaped path on a plane normal to the axis of each boring shaft, said means comprising a three dimensional cam for each of said boring arms mounted on said boring head and a cam follower mounted on each of said boring arms, said cams and said cam followers causing said boring arms to pivotally shift their angular position with respect to said boring shafts in their rotation therewith, and means mounted on said cutter bit supports for breaking off the cores formed between the cutter bits.

2. In a boring type miner, a boring head having a plurality of boring shafts extending therefrom, a boring arm extending from each of said boring shafts, said boring shafts and their associated boring arms rotating in timed relationship, a cuttings conveyor disposed between said boring shafts and arranged to receive cuttings resulting from the operation of said boring arms, each of said boring arms having cutter bit supports spaced along the length thereof and extending therefrom, cutter bits mounted on said supports, the improvement which comprises in combination with said boring arms of means for causing the end of each of said boring arms to describe in its rotation a substantially rectangular shaped path on a plane normal to the axis of each boring shaft, said means comprising pivot means pivotally connecting each boring arm to the associated boring shaft for swiveling movement of each boring arm in a plane passing through the longitudinal axis of the associated boring shaft, a three dimensional cam for each of said boring arms mounted on said boring head and a cam follower mounted on each of said boring arms, said cams and said cam followers causing said boring arms to shift their angular position with respect to said associated boring shafts in their rotation therewith.

3. In a boring type miner, a boring head having a plurality of boring shafts extending therefrom, a boring arm extending from each of said boring shafts, said boring shafts and their associated boring arms rotating in timed relationship, a cuttings conveyor disposed between said boring shafts and arranged to received the cuttings resulting from the operation of said boring arms, each of said boring arms having cutter bit supports spaced along the length thereof and extending therefrom, cutter bits mounted on said supports, means for causing the ends of each of said boring arms to describe in its rotation a substantially square shaped path on a plane normal to the axis of each boring shaft, said means comprising a pivotal means pivotally connecting each of said boring arms to the associated boring shaft for swiveling movement of the boring arms in a plane passing through the longitudinal axis of the associated boring shaft, a three dimensional cam for each of said boring arms mounted on said boring head and a cam follower mounted on each of said boring arms, said cams and cam followers causing each of said boring arms to be urged in said swiveling movement and pivotally shift their angular position relative to the boring shafts during the rotation thereof, means mounted on said boring arms for breaking off the cores formed between said cutter bits, and means mounted on said boring arms for diverting cuttings toward said cuttings conveyor.

4. In a boring type miner, a boring head having a plurality of boring shafts extending therefrom, a boring arm extending from each of said boring shafts, said boring shafts and their associated boring arms rotating in timed relationship, a cuttings conveyor disposed between said boring shafts and arranged to receive cuttings resulting from the operation of said boring arms, each of said boring arms having cutter bit supports spaced along the length thereof, cutter bits mounted on said cutter bit supports, the improvement comprising in combination with said boring arms of a means for causing the end of each boring arm to describe in its rotation a substantially rectangular shaped path in a plane normal to the axis of each boring shaft, said means comprising a pivot means pivotally connecting each of said boring arms to the respective boring shaft for swiveling movement in a plane passing through the longitudinal axis of the respective boring shaft and cam means urging said boring arms to be swivelly moved in said plane and to shift the angular position of each boring arm relative to the respective boring shaft during the rotation thereof to cause the end of each boring arm to describe said rectangular shaped path.

References Cited in the file of this patent

UNITED STATES PATENTS

| | | |
|---|---|---|
| 556,985 | Hurd | Mar. 24, 1896 |

FOREIGN PATENTS

| | | |
|---|---|---|
| 198,059 | Germany | May 2, 1908 |
| 382,954 | Great Britain | Nov. 10, 1932 |